US012809705B2

(12) United States Patent
Cao et al.

(10) Patent No.: US 12,809,705 B2
(45) Date of Patent: Nov. 24, 2026

(54) STREAMLINED SYSTEM MANAGEMENT BUS TRACING FOR ERROR DETECTION

(71) Applicant: Micron Technology, Inc., Boise, ID (US)

(72) Inventors: Qiang Cao, Shanghai (CN); Jian Wu, Shanghai (CN); Jianpeng Liu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/989,439

(22) Filed: Dec. 20, 2024

(65) Prior Publication Data

US 2026/0178432 A1 Jun. 25, 2026

(51) Int. Cl.
*G06F 11/07* (2006.01)

(52) U.S. Cl.
CPC ...... *G06F 11/0772* (2013.01); *G06F 11/0778* (2013.01); *G06F 11/0784* (2013.01)

(58) Field of Classification Search
CPC ............. G06F 11/0772; G06F 11/0778; G06F 11/0784
See application file for complete search history.

(56) References Cited

U.S. PATENT DOCUMENTS

| | | | | |
|---|---|---|---|---|
| 6,556,477 | B2 * | 4/2003 | Hsu | G11C 11/005 365/185.24 |
| 12,411,737 | B1 * | 9/2025 | Arumugham | G06F 11/1435 |
| 2016/0323148 | A1 * | 11/2016 | Butcher | H04L 41/04 |
| 2024/0070092 | A1 * | 2/2024 | Nguyen | G06F 13/105 |
| 2026/0003709 | A1 * | 1/2026 | Sridharan | G06F 11/0772 |

* cited by examiner

*Primary Examiner* — Philip Guyton
*Assistant Examiner* — Xinyuan Yu
(74) *Attorney, Agent, or Firm* — Lowenstein Sandler LLP

(57) ABSTRACT

An integrated circuit (IC) chip and/or system includes a processing core and an input/output (I/O) controller, coupled to a host interface, to detect a plurality of state transitions in a data signal received over a system management bus (SMBUS) of the host interface and generate an interrupt responsive to detecting each state transition. An interrupt controller routes each interrupt to the processing core. The processing core, in response to receipt of each respective interrupt, retrieves a corresponding state transition received over the SMBUS and stores, in a memory, the corresponding state transition.

20 Claims, 7 Drawing Sheets

200

STREAMLINED SYSTEM MANAGEMENT BUS TRACING FOR ERROR DETECTION

TECHNICAL FIELD

Embodiments of the disclosure relate generally to memory sub-systems, and more specifically, to streamlined system management bus tracing for error detection.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
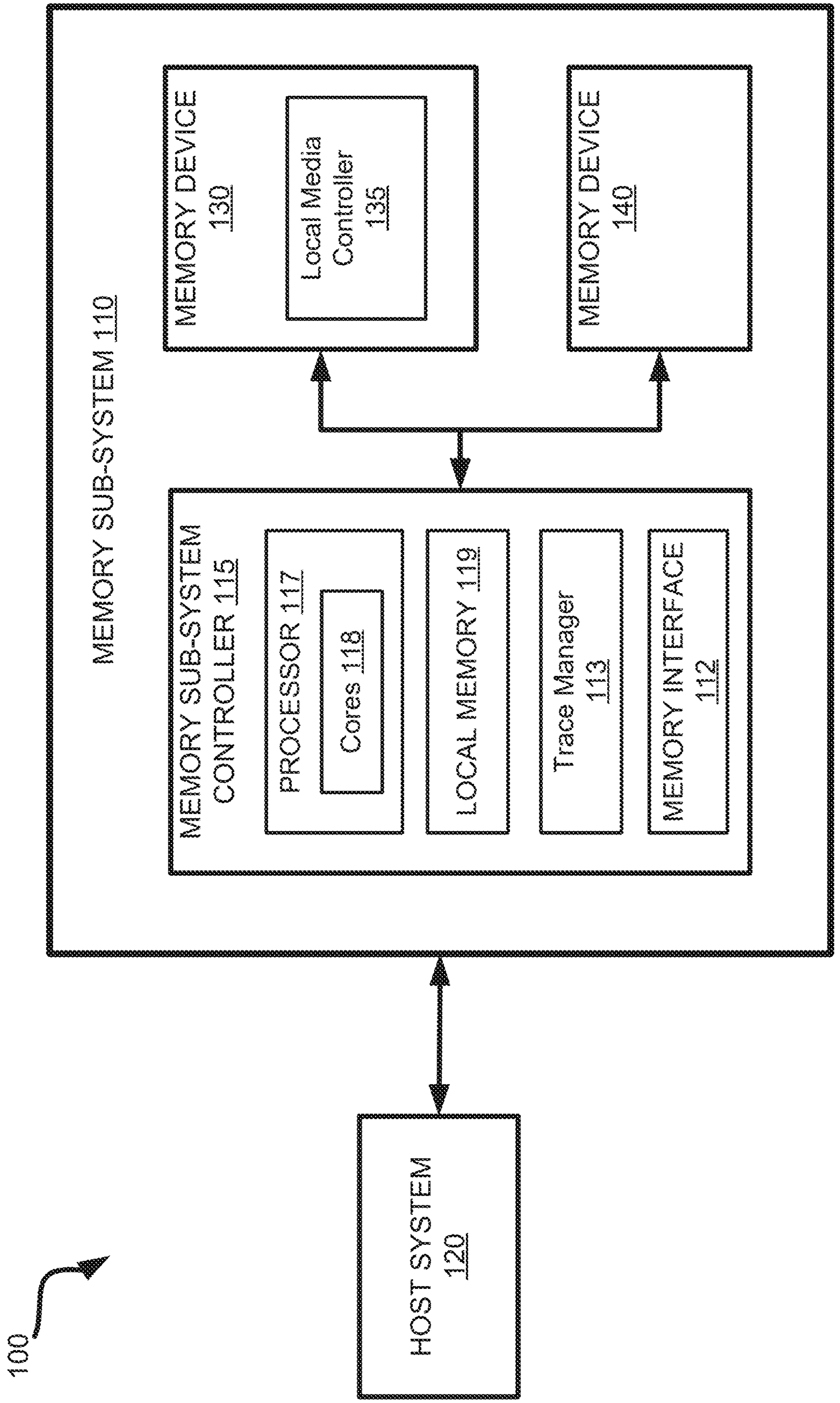
FIG. 1A illustrates an example computing system that includes a memory sub-system in accordance with some embodiments.

Aspects of the present disclosure are directed to streamlined system management bus (SMBUS) tracing for error detection within a memory sub-system controller according to some embodiments. A memory sub-system can be a storage device, a memory module, or a combination of a storage device and memory module. Examples of storage devices and memory modules are described below in conjunction with FIG. 1A. In general, a host system can utilize a memory subsystem that includes one or more components, such as memory devices that store data. The host system can provide data to be stored at the memory sub-system and request data to be retrieved from the memory sub-system.

A memory sub-system can include high-density, non-volatile memory devices where retention of data is desired when no power is supplied to the memory device. For example, NAND memory, such as 3D flash NAND memory, offers storage in the form of compact, high-density configurations. A non-volatile memory device is a package of one or more memory dies, each including one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory sub-system controller (or more simply "controller" herein) can be employed to control memory accesses of the non-volatile memory devices (and volatile memory devices) on behalf of a host system and other agents accessing the memory devices as input/output (I/O) devices. More specifically, the memory sub-system controller can perform a number of functionalities associated with a memory sub-system, including memory access and management, protocol handling, performance optimization, error detection and correction, wear leveling and longevity management, power and thermal management, firmware updates and management, among others. A system management bus (SMBUS) extends between a host system and the controller as well as between the controller and the memory devices. Thus, the SMBUS plays a significant role in the many management functionalities of the controller. Accordingly, there are a variety of errors that can occur in performing these functionalities that can be difficult to detect without the ability to capture an SMBUS trace of clock and data waveforms over the SMBUS.

In certain memory sub-systems, various implementations of SMBUS tracing have been employed, but without satisfactory tradeoffs between complexity and cost. For example, in some memory sub-systems, a Peripheral Component Interconnect Express (PCIe) tracer is a hardware component deployed at a side of the host system. This PCIe trace implementation of SMBUS tracing is expensive and, therefore, is rarely available to the memory sub-system controller. In some other memory sub-systems, an SMBUS analyzer is integrated at clock and data pins of the SMBUS, again, on the host system side of the memory sub-system. While the SMBUS analyzer is less expensive, implementation is especially complicated in needing to connect directly to the clock and data pins and be adaptable to different host interfaces of different controllers.

Aspects of the present disclosure address the above and other deficiencies by using an existing I/O controller and interrupt controller in connection with an existing processing core of the memory sub-system controller to retrieve and store state transitions received over the SMBUS. These state transitions can then be employed in generating an SMBUS trace, e.g., the SMBUS clock and data waveforms that can be employed in detecting one or more errors of the controller.

In some embodiments, an integrated circuit (IC) chip or system on a chip (SoC) embodying the memory sub-system controller includes a processing core and an I/O controller coupled to a host interface. The I/O controller can detect a plurality of state transitions in a signal received over a system management bus (SMBUS) of the host interface and generate an interrupt responsive to detecting each state transition. In varying embodiments, the signal is a data signal or a clock signal, where each can be independently monitored for state transitions. An interrupt controller can be coupled to the I/O controller and the processing core, the interrupt controller configured to route each interrupt to the processing core. The processing core (e.g., in executing firmware), in response to receipt of each respective interrupt, can retrieve a corresponding state transition received over the SMBUS and store, in a memory, the corresponding state transition. This memory can be a local memory on chip of the controller, for example.

In additional embodiments, the processing core further incorporates at least some of the plurality of state transitions stored in the memory into a trace log and store the trace log in a non-volatile memory device coupled to the processing core. The processing core can, at some point, for purposes of troubleshooting particular issues or errors of the controller, retrieve the trace log from the non-volatile memory, and restore the SMBUS data waveform and SMBUS clock waveform for a period of interest. The processing core or other computing device available to a design engineer can then analyze these SMBUS waveforms to detect one or more memory sub-system controller errors, e.g., undiagnosed IC chip errors or SoC errors.

Advantages of the present disclosure include providing a way to debug customer memory sub-system issues without the use of PCIe® trace hardware or an SMBUS analyzer. The disclosed solutions are low-cost and provide the flexibility and ease of use of being directed in firmware executed by one or more processing cores of the sub-system controller. These and other advantages will be apparent based on the additional details provided herein.

FIG. 1A illustrates an example computing system 100 that includes a memory subsystem 110 in accordance with some embodiments of the present disclosure. The memory sub-system 110 can include media, such as one or more volatile memory devices (e.g., memory device 140), one or more non-volatile memory devices (e.g., memory device 130), or a combination of such memory devices.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory subsystem controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In one embodiment, the memory sub-system 110 includes a memory interface component 112. Memory interface component 112 is responsible for handling interactions of memory sub-system controller 115 with the memory devices of memory sub-system 110, such as memory device 130. For example, memory interface component 112 can send memory access commands corresponding to requests received from host system 120 to memory device 130, such as program commands, read commands, or other commands. In addition, memory interface component 112 can receive data from memory device 130, such as data retrieved in response to a read command or a confirmation that a program command was successfully performed.

In some embodiments, the memory sub-system controller 115 includes a trace manager 113 configured to manage retrieving state transitions received over an SMBUS (e.g., of the aforementioned physical host interface) in response to receipt of interrupts, each which signal that such a transition has occurred. In some embodiments, the trace manager 113 is executed by firmware within one or more of a plurality of cores 118 of the processor 117. The trace manager 113 can further store, in a memory such as the local memory 119, state transitions corresponding to each interrupt. In embodiments, the trace manager 113 further incorporates at least some of the state transitions stored in the local memory 119 into a trace log and store the trace log in the memory device 130. The processing core can, at some point, for purposes of troubleshooting particular issues or errors of the controller 115, retrieve the trace log from the memory device 130, and restore the SMBUS data waveform and SMBUS clock waveform for a period of interest.

Figure 1B:
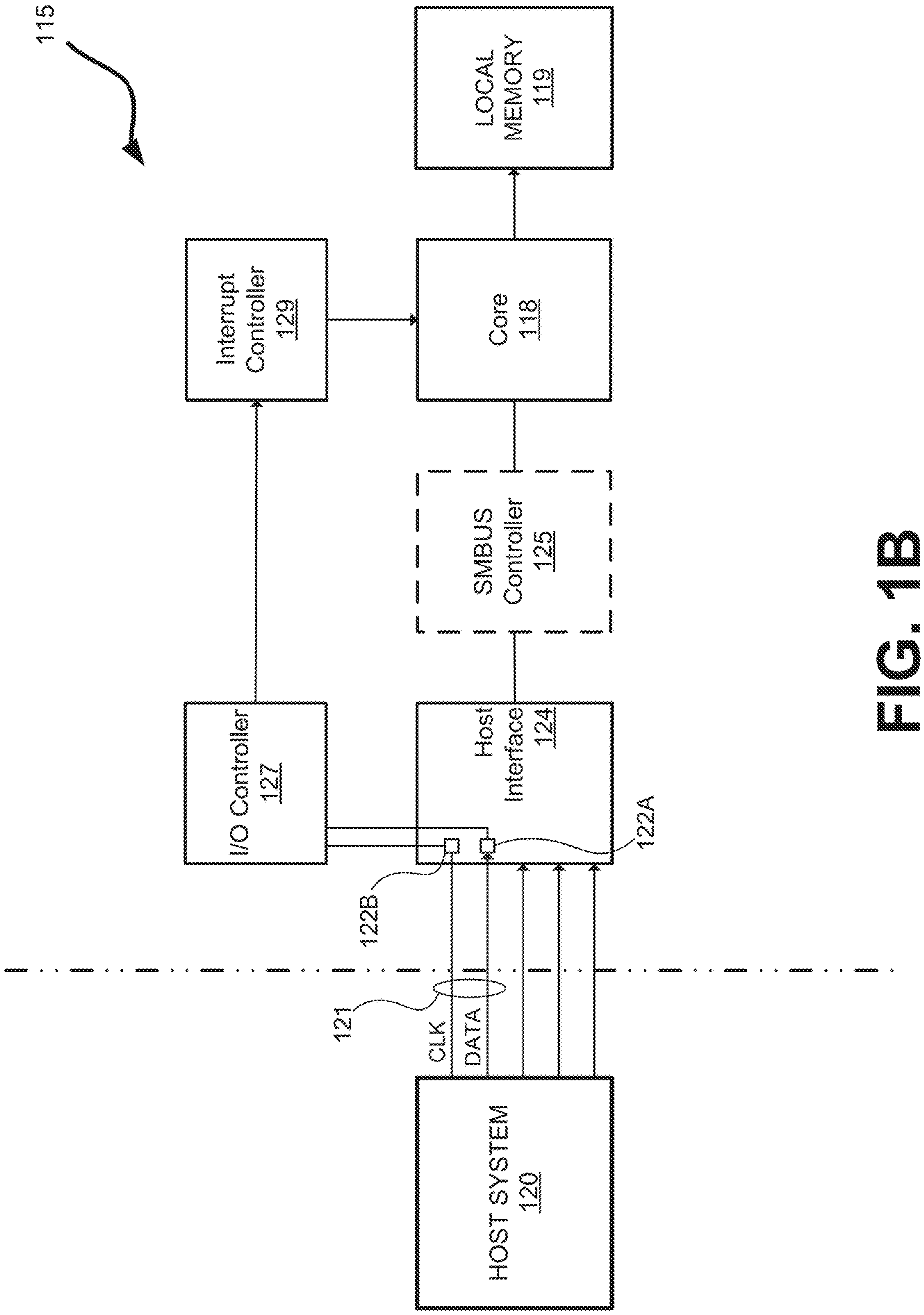
FIG. 1B illustrates a memory sub-system controller with a system management bus (SMBUS) trace manager according to some embodiments.

FIG. 1B illustrates the memory sub-system controller 115 with an SMBUS trace manager 113 according to some embodiments. In such embodiments, the controller 115 also includes a host interface 124 (such as the physical host interface referred to with reference to FIG. 1A), an I/O controller 127 coupled to the host interface 124, and an interrupt controller 129 coupled between the I/O controller 127 and the core 118. In at least one embodiment, the I/O controller 127 is an general purpose I/O (GPIO) controller. In some optional embodiments, the controller 115 also includes an SMBUS controller 125 coupled between the core 118 and the host interface 124. The local memory 119 can be coupled to the core 118 as well. In some embodiments, the local memory 119 is static random access memory (SRAM) or a tightly-coupled memory (TCM).

In some embodiments, an SMBUS 121, which includes a clock line carrying a clock signal and a data line carrying a data signal, is coupled between the host system 120 and the host interface 124 of the controller 115. In such embodiments, the host interface 124 includes an SMBUS data pin 122A coupled to the data line and an SMBUS clock pin 122B coupled to the clock line of the SMBUS 121. The I/O controller 127 can then detect state transitions that occur over the SMBUS 121, e.g., both at the SMBUS data pin 122A and at the SMBUS clock pin 122B.

In at least some embodiments, the I/O controller 127 can detect a plurality of state transitions in a data signal received over the SMBUS 121 of the host interface 124 and generates an interrupt responsive to detecting each state transition. The I/O controller 127 can transmit each interrupt to the interrupt controller 129. In embodiments, the interrupt controller 129 routes each interrupt to the processing core 118. The processing core 118 can then retrieve a corresponding state transition received over the SMBUS 121 and store, in the local memory 119, the corresponding state transition.

When deployed, the SMBUS controller 125 can receive a command from the processing core 118 for the corresponding state transition and, in response to the command, access the corresponding state transition collected from an SMBUS data pin 122A (or the SMBUS clock pin 122B) of the host interface 124, and provide the corresponding state transition to the processing core 118.

In additional embodiments, the processing core 118 further incorporates at least some of the state transitions stored in the local memory 119 into a trace log and stores the trace log in a non-volatile memory device (e.g., memory device 130) coupled to the processing core 118. The processing core can, at some point, for purposes of troubleshooting particular issues or errors of the controller, retrieve the trace log from the non-volatile memory, and restore the SMBUS data waveform and SMBUS clock waveform for a period of interest. The processing core 118 or other computing device available to a design engineer can then analyze these SMBUS waveforms to detect one or more memory subsystem controller errors, e.g., IC chip errors or SoC errors.

Figure 2:
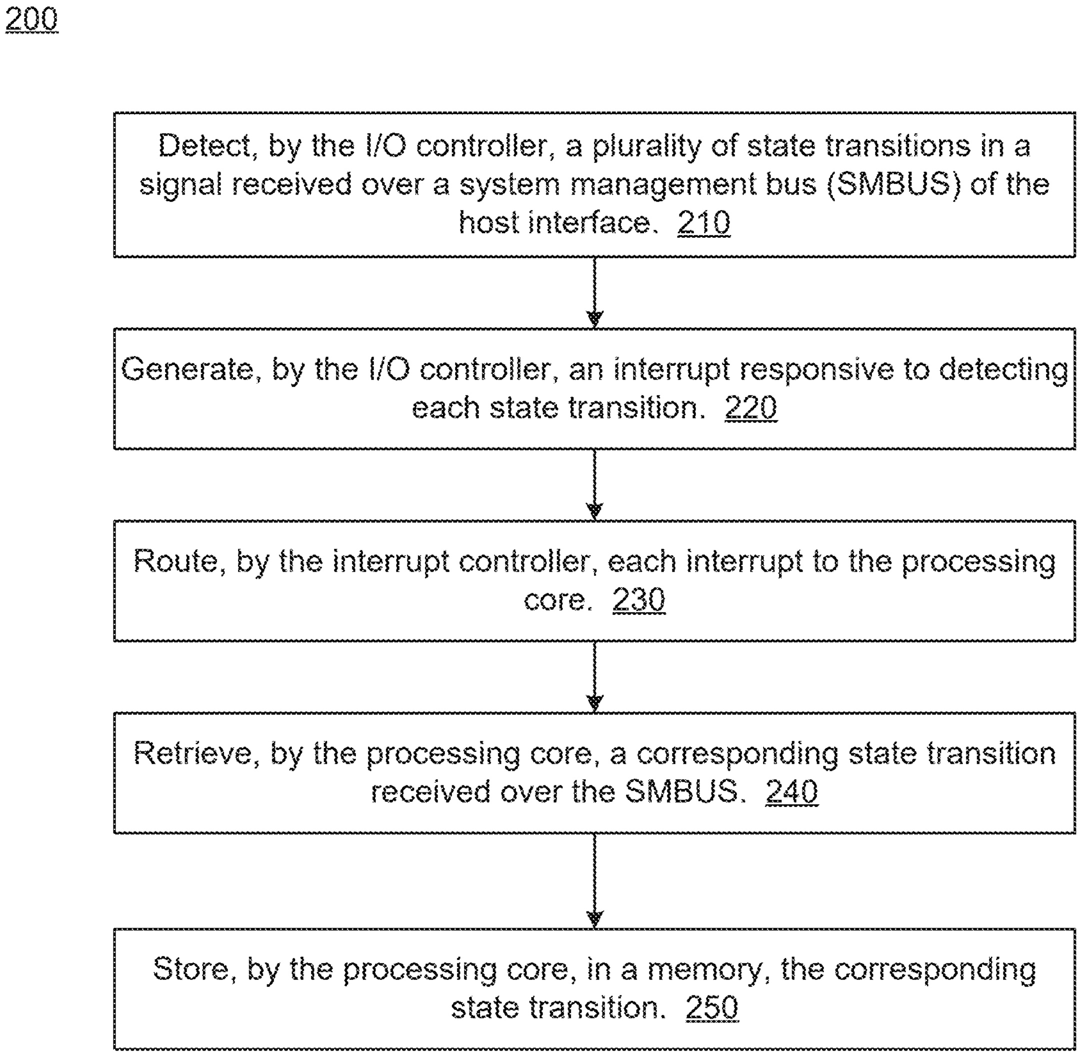
FIG. 2 is a flow diagram of an example method of efficiently tracing state transitions from an SMBUS for purposes of detecting errors of the memory sub-system controller according to some embodiments.

FIG. 2 is a flow diagram of an example method 200 of efficiently tracing state transitions from an SMBUS for purposes of detecting errors of the memory sub-system controller according to some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the controller 115, to include the trace manager 113, of FIGS. 1A-1B. In some embodiments, the method 200 incorporates operating the memory sub-system controller 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the method 200 includes detecting, by the I/O controller 127, a plurality of state transitions in a signal received over a system management bus (SMBUS) of the host interface. In some embodiments, the signal is a data signal received over the SMBUS data pin 122A. In other embodiments, the signal is a clock signal received over the SMBUS clock pin 122B.

At operation 220, the method 200 includes generating, by the I/O controller 127, an interrupt responsive to detecting each state transition.

At operation 230, the method 200 includes routing, by the interrupt controller 129, each interrupt to the processing core 118.

At operation 240, the processing logic retrieves a corresponding state transition received over the SMBUS 121.

At operation 250, the processing logic stores, in a memory, the corresponding state transition. In embodiments, the memory is the local memory 119.

Figure 3:
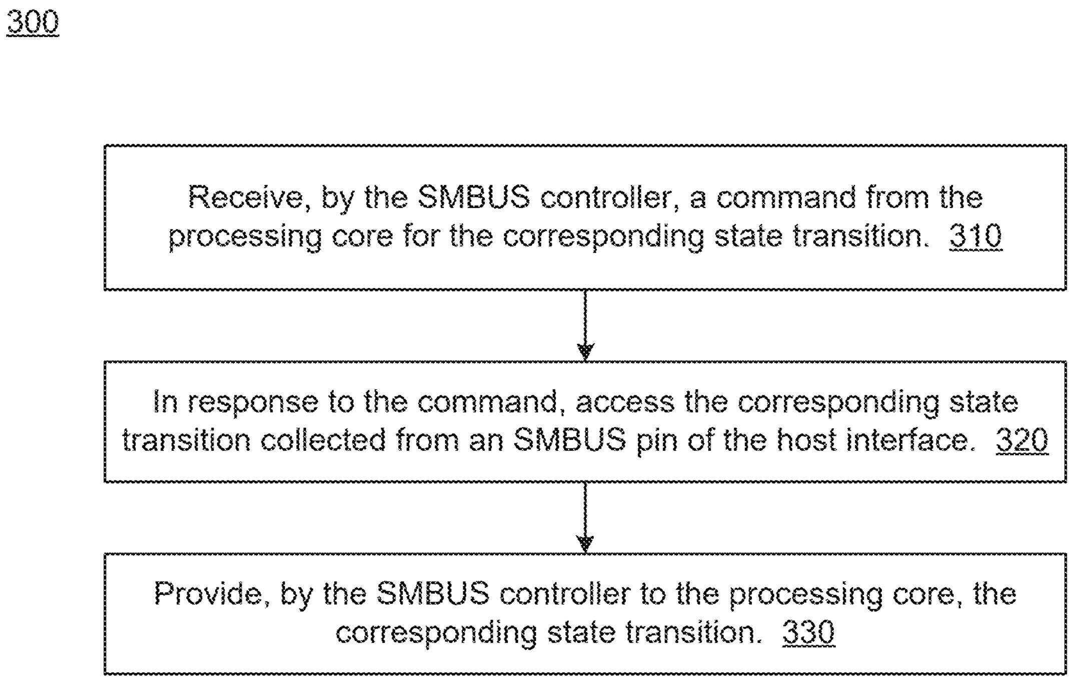
FIG. 3 is a flow diagram of an example method of employing an SMBUS controller to retrieve the state transitions over the SMBUS according to some embodiments.

FIG. 3 is a flow diagram of an example method 300 of employing an SMBUS controller to retrieve the state transitions over the SMBUS according to some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the controller 115, to include the trace manager 113, of FIGS. 1A-1B. In some embodiments, the method 300 incorporates operating the memory sub-system controller 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the method 300 includes receiving, by the SMBUS controller 125, a command from the processing core 118 for the corresponding state transition.

At operation 320, the method 300 includes, in response to the command, accessing the corresponding state transition collected from an SMBUS pin of the host interface 124. In some embodiments, the signal is a data signal received over the SMBUS 121 and so the state transition is collected from the SMBUS data pin 122A. In other embodiments, the signal is a clock signal received over the SMBUS 121 and so the state transition is instead collected for the SMBUS clock pin 122B.

At operation 330, the method 300 includes providing, by the SMBUS controller 125 to the processing core 118, the corresponding state transition.

Figure 4A:
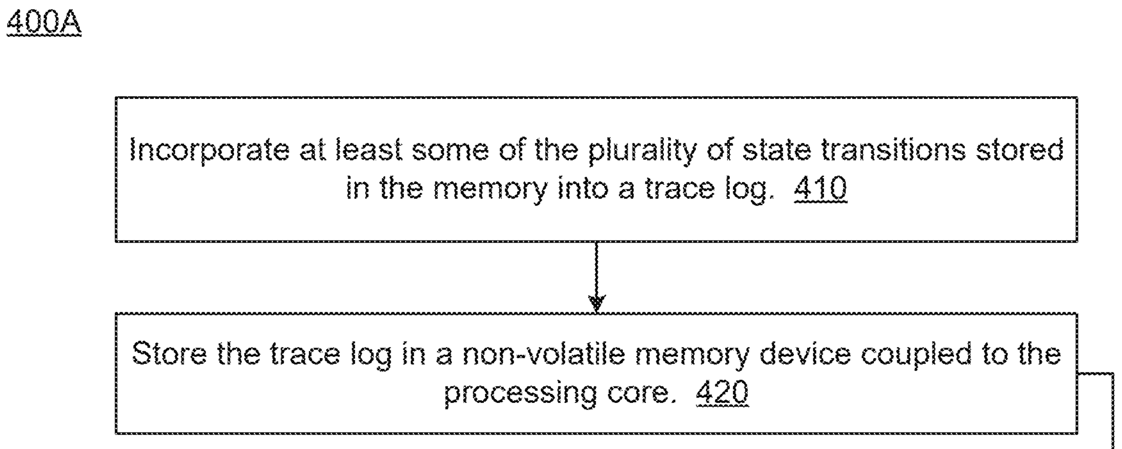
FIG. 4A is a flow diagram of an example method for incorporating stored state transitions into a trace log that is stored in non-volatile memory according to some embodiments.

FIG. 4A is a flow diagram of an example method 400A for incorporating stored state transitions into a trace log that is stored in non-volatile memory according to some embodiments. The method 400A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400A is performed by the controller 115, to include the trace manager 113, of FIGS. 1A-1B. In some embodiments, the method 400A incorporates operating the memory sub-system controller 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic incorporates at least some of the plurality of state transitions stored in the memory into a trace log.

At operation 420, processing logic stores (or causes to be stored) the trace log in a non-volatile memory device coupled to the processing core 118, such as in the memory device 130.

Figure 4B:
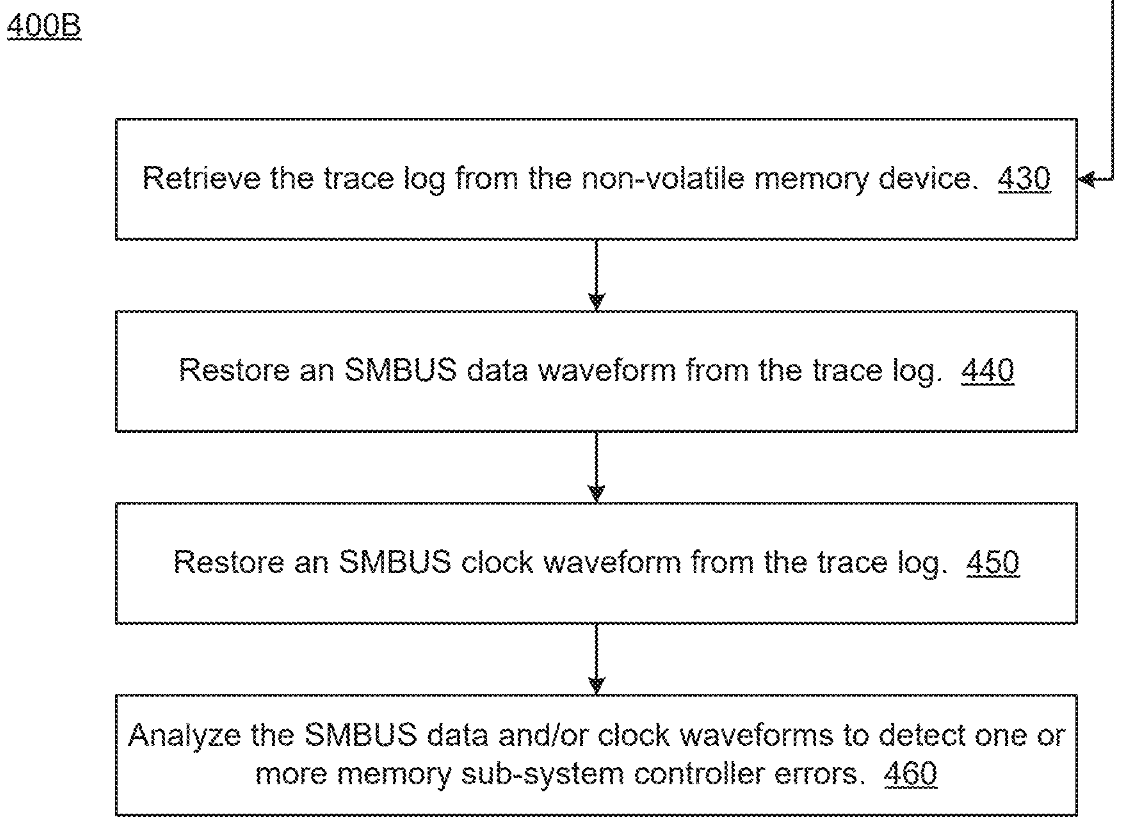
FIG. 4B is a flow diagram of an example method for employing the trace log for restoring an SMBUS waveform useable for detecting errors of the memory sub-system controller according to some embodiments.

FIG. 4B is a flow diagram of an example method 400B for employing the trace log for restoring an SMBUS waveform useable for detecting errors of the memory sub-system controller according to some embodiments. The method 400B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400B is performed by the controller 115, to include the trace manager 113, of FIGS. 1A-1B. In some embodiments, the method 400B incorporates operating the memory sub-system controller 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 430, the processing logic retrieves the trace log from the non-volatile memory device.

At operation 440, the processing logic restores an SMBUS data waveform from the trace log.

At operation 450, the processing logic restores an SMBUS clock waveform from the trace log.

At operation 460, the processing logic analyzes the SMBUS data waveform and/or the SMBUS clock waveform to detect one or more system errors, e.g., issues with the memory subsystem controller 115 or undiagnosed errors.

Figure 5:
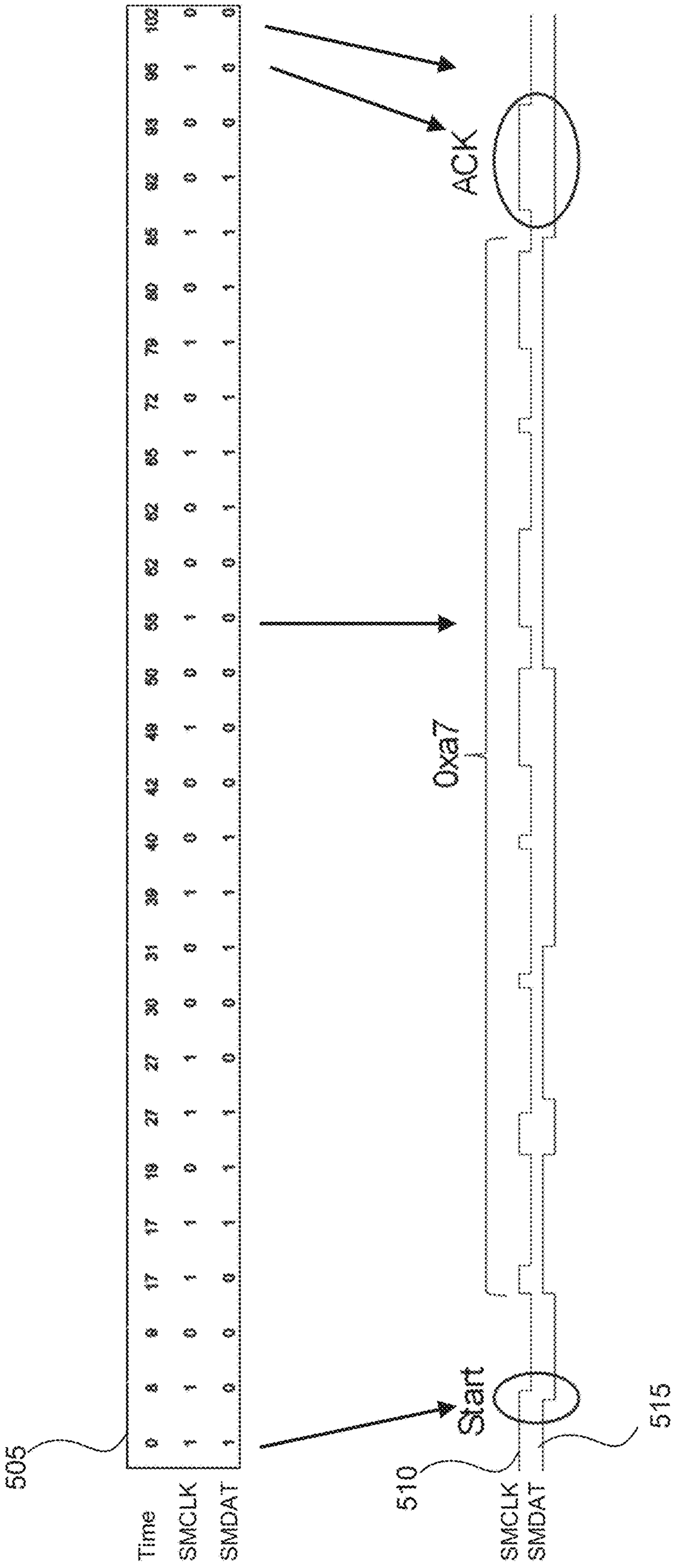
FIG. 5 is a set of diagrams illustrating trace log output of the transitional states and corresponding SMBUS data and clock waveforms restored as per FIG. 4B according to some embodiments.

FIG. 5 is a set of diagrams illustrating trace log output of the transitional states and corresponding SMBUS data and clock waveforms restored as per FIG. 4B according to some embodiments. For example, in table 505, illustrated are a row of time stamps, a row of SM clock (SMCLK) state transitions, and a row of SM data (SMDAT) transitions, respectively. Also illustrated is an example of the SMBUS clock waveform 510 restored from the SM clock state transitions from the table 505. Further illustrated is an example of the SMBUS data waveform restored from the SM data state transitions from the table 505. In at least some embodiments, by analyzing the combination of SMBUS clock waveform 510 and SMBUS data waveform 515, even more issues of error associated with the memory sub-system controller 115 can be detected.

Figure 6:
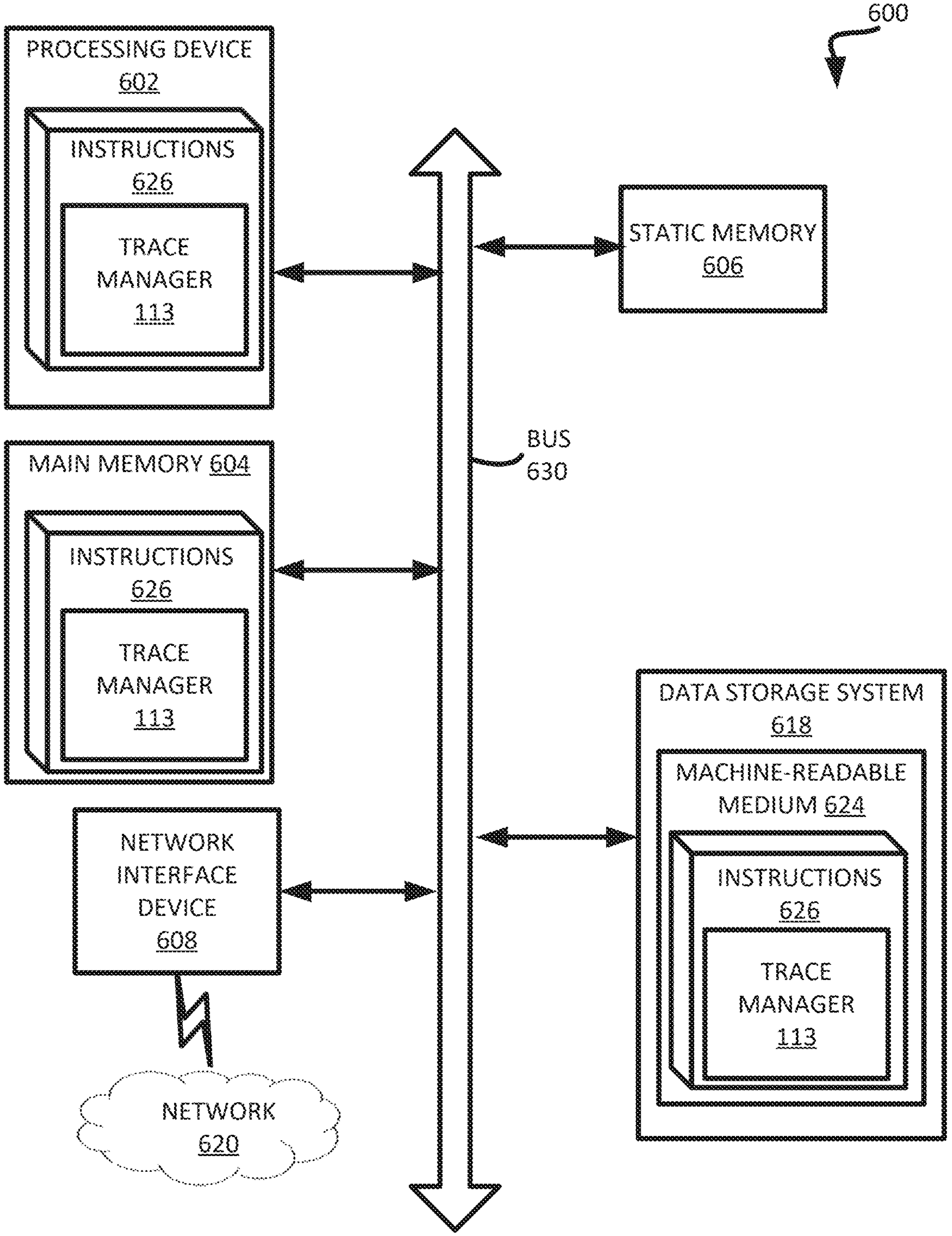
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the trace manager 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium, such as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to the trace manager 113 of FIG. 1A. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An integrated circuit (IC) chip comprising:
a processing core;
an input/output (I/O) controller, coupled to a host interface, to:
detect a plurality of state transitions in a data signal received over a system management bus (SMBUS) of the host interface; and
generate an interrupt responsive to detecting each state transition; and
an interrupt controller, coupled to the I/O controller and the processing core, to route each interrupt to the processing core; and
wherein the processing core is to perform operations comprising:
in response to receipt of each respective interrupt:
retrieving a corresponding state transition received over the SMBUS; and
storing, in a memory, the corresponding state transition;
incorporating at least some of the plurality of state transitions stored in the memory into a trace log;
restoring an SMBUS data waveform from the trace log; and
analyzing the SMBUS data waveform to detect one or more IC chip errors.

2. The IC chip of claim 1, further comprising the memory, wherein the memory is a local memory comprising one of a static random access memory or a tightly-coupled memory.

3. The IC chip of claim 1, further comprising:
the host interface; and
an SMBUS controller, coupled between the host interface and the processing core, to:
receive a command from the processing core for the corresponding state transition;
in response to the command, access the corresponding state transition collected from an SMBUS data pin of the host interface; and
provide the corresponding state transition to the processing core.

4. The IC chip of claim 1, wherein the I/O controller is a general purpose I/O controller.

5. The IC chip of claim 1, wherein the operations further comprise storing the trace log in a non-volatile memory device coupled to the processing core.

6. The IC chip of claim 5, wherein the operations further comprise retrieving the trace log from the non-volatile memory device.

7. A system comprising:

a processing core;

an input/output (I/O) controller, coupled to a host interface, to:

detect a plurality of state transitions in a clock signal received over a system management bus (SMBUS) of the host interface; and generate an interrupt responsive to detecting each state transition; and an interrupt controller, coupled to the I/O controller and the processing core, to route each interrupt to the processing core; and wherein the processing core is to perform operations comprising, in response to receipt of each respective interrupt:

retrieving a corresponding state transition received over the SMBUS; and buffering, in a memory, the corresponding state transition.

8. The system of claim 7, further comprising the memory, wherein the memory is a local memory comprising one of a static random access memory or a tightly-coupled memory.

9. The system of claim 7, further comprising:

the host interface; and an SMBUS controller, coupled between the host interface and the processing core, to:

receive a command from the processing core for the corresponding state transition;

in response to the command, access the corresponding state transition collected from a SMBUS clock pin of the host interface; and provide the corresponding state transition to the processing core.

10. The system of claim 7, wherein the I/O controller is a general purpose I/O controller.

11. The system of claim 7, wherein the operations further comprise:

incorporating at least some of the plurality of state transitions stored in the memory into a trace log; and storing the trace log in a non-volatile memory device coupled to the processing core.

12. The system of claim 11, wherein the operations further comprise:

retrieving the trace log from the non-volatile memory device;

restoring an SMBUS clock waveform from the trace log; and analyzing the SMBUS clock waveform to detect one or more system errors.

13. A method of operating a system controller comprising a processing core, an I/O controller coupled to a host interface, and an interrupt controller coupled between the I/O controller and the processing core, and wherein the method of operating the system controller comprises:

detecting, by the I/O controller, a plurality of state transitions in a signal received over a system management bus (SMBUS) of the host interface; and generating, by the I/O controller, an interrupt responsive to detecting each state transition;

routing, by the interrupt controller, each interrupt to the processing core;

in response to receiving each respective interrupt:

retrieving, by the processing core, a corresponding state transition received over the SMBUS; and storing, by the processing core, in a memory, the corresponding state transition;

incorporating, by the processing core, at least some of the plurality of state transitions stored in the memory into a trace log;

restoring an SMBUS data waveform from the trace log; and analyzing, by the processing core, the SMBUS data waveform to detect one or more IC chip errors.

14. The method of claim 13, wherein the signal is a data signal received over the SMBUS.

15. The method of claim 14, wherein the system controller further comprises an SMBUS controller coupled between the host interface and the processing core, and the method further comprises:

receiving, by the SMBUS controller, a command from the processing core for the corresponding state transition;

in response to the command, accessing the corresponding state transition collected from an SMBUS data pin of the host interface; and providing, by the SMBUS controller to the processing core, the corresponding state transition.

16. The method of claim 13, wherein the signal is a clock signal received over the SMBUS.

17. The method of claim 16, wherein the system controller further comprises an SMBUS controller coupled between the host interface and the processing core, and the method further comprises:

receiving, by the SMBUS controller, a command from the processing core for the corresponding state transition;

in response to the command, accessing the corresponding state transition collected from a SMBUS clock pin of the host interface; and providing, by the SMBUS controller to the processing core, the corresponding state transition.

18. The method of claim 13, further comprising storing the trace log in a non-volatile memory device coupled to the processing core.

19. The method of claim 18, further comprising retrieving the trace log from the non-volatile memory device.

20. The method of claim 18, further comprising:

retrieving the trace log from the non-volatile memory device;

restoring an SMBUS clock waveform from the trace log; and analyzing the SMBUS clock waveform to detect one or more system controller errors.

* * * * *